United States Patent [19]
Ikeda et al.

[11] Patent Number: 6,042,176
[45] Date of Patent: *Mar. 28, 2000

[54] ENERGY ABSORBING STRUCTURE OF VEHICLE BODY UPPER PORTION OF AUTOMOBILE

[75] Inventors: Koki Ikeda; Toshiya Miyashita, both of Toyota, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/837,043

[22] Filed: Apr. 11, 1997

[30] Foreign Application Priority Data

Apr. 12, 1996 [JP] Japan ................... 8-114326

[51] Int. Cl.⁷ ................................. B60R 21/02
[52] U.S. Cl. .................... 296/189; 296/203.03; 188/371; 280/748
[58] Field of Search ................ 296/189, 203.03, 296/210; 188/376, 377, 371; 280/748

[56] References Cited

U.S. PATENT DOCUMENTS

| | | |
|---|---|---|
| 2,939,741 | 6/1960 | Keating et al. . |
| 5,529,344 | 6/1996 | Yasui et al. . |
| 5,544,928 | 8/1996 | Mori et al. . |
| 5,609,385 | 3/1997 | Daniel et al. ................ 296/189 X |
| 5,800,008 | 9/1998 | Gondo ................................ 296/189 |
| 5,836,641 | 11/1998 | Sugamoto et al. ................ 296/189 |
| 5,842,719 | 12/1998 | Tanaka ........................ 180/371 X |

FOREIGN PATENT DOCUMENTS

| | | |
|---|---|---|
| 763449 | 3/1997 | European Pat. Off. . |
| 982493 | 3/1997 | France . |
| 7-172169 | of 0000 | Japan . |
| 5161 | 9/1994 | Japan . |
| 95016 | 2/1995 | Japan . |
| 7-61304 | 3/1995 | Japan . |
| 7-96790 | 4/1995 | Japan . |
| 7-232583 | 9/1995 | Japan . |
| 8-20274 | 1/1996 | Japan . |

OTHER PUBLICATIONS

Patent Abstracts of Japan, vol. 95, No. 10, Nov. 1995 re Jp 07/172265.
Patent Abstracts of Japan, vol. 96, No. 1, Jan. 1996 re JP 07/232583.
Patent Abstracts of Japan, vol. 96, No. 3, Mar. 1996 re JP 07/304419.

*Primary Examiner*—D. Glenn Dayoan
*Assistant Examiner*—Jason Morrow
*Attorney, Agent, or Firm*—Pillsbury Madison & Sutro LLP

[57] ABSTRACT

An energy absorbing structure of a vehicle body upper portion of an automobile, including a roofside rail (20) forming a closed sectional space (28) by an outer panel (24) and an inner panel (26), and an assist grip (22) disposed in the inward of the roofside rail is described. The energy absorbing structure includes a metal energy absorbing bracket (32) disposed in the closed sectional space deformable outwardly of the passenger compartment. The assist grip (22) is mounted on an intermediate portion (36) of an energy absorbing bracket and supported by support means (42) passing through a hole (40) made in the inner panel.

28 Claims, 5 Drawing Sheets

ENERGY ABSORBING STRUCTURE OF VEHICLE BODY UPPER PORTION OF AUTOMOBILE

BACKGROUND OF THE INVENTION

1. Field of the Invention

This invention relates to an energy absorbing structure of a vehicle body upper portion of an automobile, more particularly, of a passenger car. The vehicle body upper portion includes a structural member such as a roofside rail and a header forming a closed sectional space by an outer panel and an inner panel as well as passenger compartment furnishings such as an assist grip, a reading lamp, and a sun visor to be disposed in the inward side of the structural member.

2. Description of the Related Art

Having a great rigidity, a structural member such as a roofside rail and a header is hard to absorb an impact energy, when it is applied through a passenger compartment furnishing such as an assist grip, a reading lamp, and a sun visor disposed in the inward of the structural member. Therefore, measures such as to make an inner panel of a structural member having a readily deformable structure (Japanese Patent Public Disclosure No. 7-232583), or as to make a mounting portion for mounting a passenger compartment furnishings on the inner panel of the structural member or the assist grip itself have a readily deformable structure (Japanese Patent Public Disclosure No. 7-61304) are sometimes taken.

SUMMARY OF THE INVENTION

While an initial object can be achieved by taking the foregoing measures, it is also feared that the rigidity of the structural member and the strength of the passenger compartment furnishings might be degraded. Also, it is difficult to ensure a sufficient amount of energy absorption without accompanying a reduction in a head clearance.

The present invention provides an energy absorbing structure of a vehicle body upper portion of an automobile, capable of ensuring a sufficient amount of energy absorption without substantially degrading the rigidity of the structural member and the strength of passenger compartment furnishings.

The present inventions relates to an energy absorbing structure of a vehicle body upper portion of an automobile comprising a structural member forming a closed sectional space by an outer panel and an inner panel and furnishings disposed in the inward of a passenger compartment of the structural member, and has a metal energy absorbing bracket disposed in the closed sectional space, with its outer rim portion adhered, deformable in the outward direction of the passenger compartment. The passenger compartment furnishing is supported by support means penetrating a hole made in the inner panel, the support means being attached to a portion other than the outer rim portion of the energy absorbing bracket.

The structural member is, for example, a roofside rail or a header, and the passenger compartment furnishing is an assist grip, a reading lamp or a sun visor. The energy absorbing bracket is made not to be substantially brought into contact with the inner panel when a load in the inward direction of the passenger compartment is applied, so that the energy absorbing bracket itself can take the load, or otherwise the energy absorbing bracket is brought into contact with the inner panel so that the energy absorbing bracket can take the load in cooperation with the inner panel. The inner panel can be provided with a seat portion which is convex outwardly of the passenger compartment, and the hole can be made in the seat portion.

In case where the structural member is a roofside rail of a vehicle body, the outer rim portion of the energy absorbing bracket can be welded at various portions, i.e., two flange joint portions of the outer panel and the inner panel of the roofside rail, an inner portion of the inner panel inwardly spaced apart from the two flange joint portions, and an inclined portion of the inner panel connecting each flange joint portion and the inner portion. Further, the outer rim of the energy absorbing bracket can be welded to the outer panel of the roofside rail, or to a reinforcing panel disposed between the outer panel and the inner panel. The furnishings or the equipment for the passenger compartment such as an assist grip or a reading lamp can be attached to the energy absorbing bracket even if the outer rim portion of the energy absorbing bracket is welded in any mode. The energy absorbing bracket can have a bellows portion or an uneven portion.

In case where the structural member is a header and the equipment for the passenger compartment is a sun visor, the energy absorbing bracket, in one embodiment, includes two base portions secured to the outer panel of the header with a space in the lateral direction of the vehicle body, and an inner portion with a space from the base portions inwardly thereof and an inclined portion connecting the inner portion and each of the base portions, the supporting means of the sun visor being mounted on the inner portion of the energy absorbing bracket. In another embodiment, the energy absorbing bracket includes two base portions secured to the inner panel of the header with a space in the lateral direction of the vehicle body, a mounting portion between these base portions and a zigzag path portion between each of the base portions and the mounting portion, the supporting means of the sun visor being mounted on the mounting portion of the energy absorbing bracket.

When a predetermined or more impact load is applied from the furnishings outwardly of the passenger compartment, the energy absorbing bracket is deformed outwardly and absorbs the impact energy.

A hole is made in the inner panel of the structural member for support means supporting the furnishings, but this hole may only be large enough for the support means to pass through and small enough in comparison with the size of the entire inner panel. Consequently, the hole has no substantial influence on the rigidity of the structural member. Also, since there is no means whatsoever given in the furnishings itself, the strength of the furnishings is not lowered.

The energy absorbing bracket is disposed in the space of the closed section formed by the outer panel and the inner panel of the structural member, and can be installed irrespective of the interior trim material, so that a necessary stroke for energy absorption can be ensured without influencing a head clearance. Also, since the thickness and the shape of the energy absorbing bracket can be individually determined irrespective of the thickness and the shape of the outer panel or the inner panel of the structural member, it is easy to ensure a necessary amount of energy absorption. In addition, since the energy absorbing bracket is made of metal, an energy absorbing characteristic with a rapid rising of a load relative to a displacement can be obtained.

On the other hand, as regards the furnishings, by the rigidity of the energy absorbing bracket itself or by the rigidities of the energy absorbing bracket and the inner panel an inwardly directed load can be caught, and the furnishings is firmly held against the inwardly directed load.

In working the present invention, for example, in case the structural member is a roofside rail, the structural member is formed by the outer panel and the inner panel to become a space having a closed section when cut at an imaginary plane vertical to the center axis extending in the forward and backward direction or longitudinal direction of an automobile. A reinforcing panel can be disposed between the outer panel and the inner panel, and further, the energy absorbing bracket is disposed in the space having the closed section. All the panels can be shaped to have a desired sectional configuration by press-molding a steel plate. In this case, the outer panel can be set as thick as 0.6 to 1.2 mm, the inner panel as thick as 1.0 to 1.4 mm, and the reinforcing panel as thick as 1.2 to 1.6 mm, and the energy absorbing bracket can be set as the thinnest, as thick as 0.4 to 0.8 mm.

The outer rim portion of the energy absorbing bracket can be welded to the inner panel, the outer panel or the reinforcing panel. The support means preferably has a function of a spacer and can be formed by a resin sleeve and a bolt. The bolt of the support means passed through the furnishings is screwed into a nut welded beforehand to the energy absorbing bracket, thereby mounting the furnishings on the energy absorbing bracket.

DESCRIPTION OF THE PREFERRED EMBODIMENTS

Figure 1:
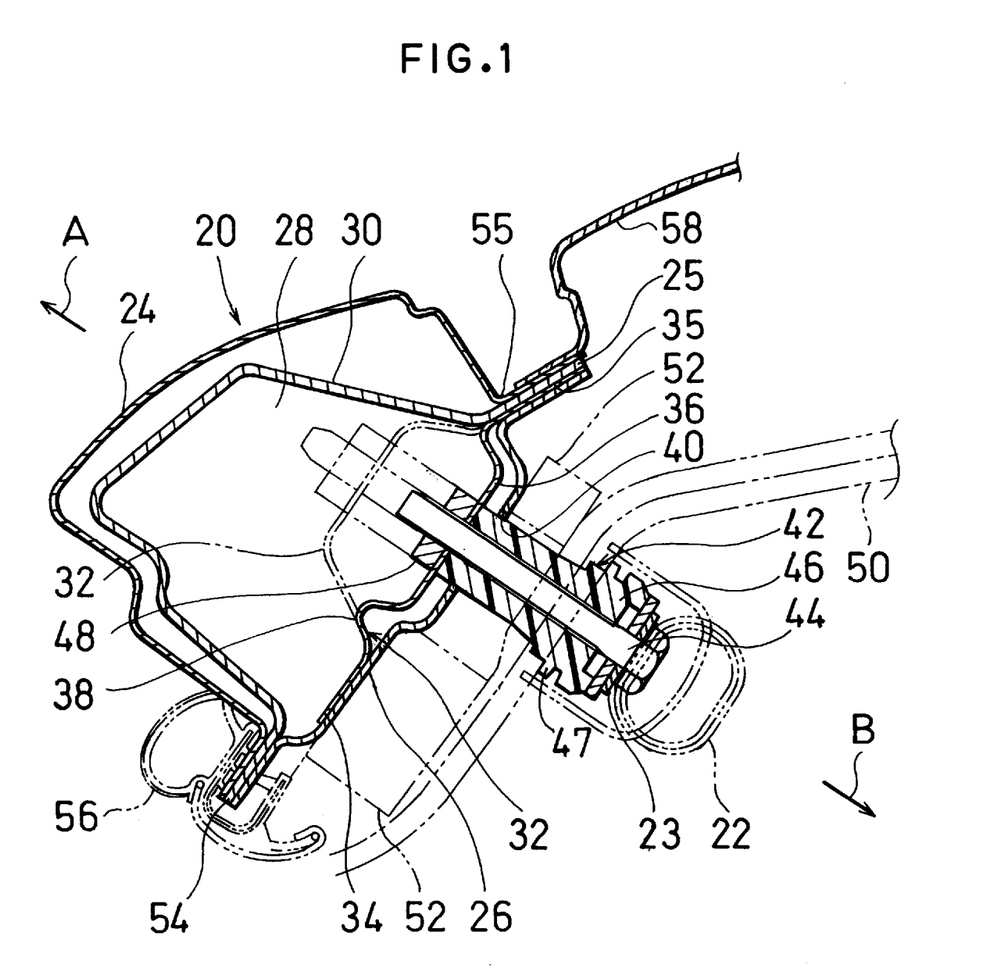
FIG. 1 is a cross-sectional view of an embodiment of an energy absorbing structure of a vehicle body upper portion of an automobile relative to the present invention, cut at a vertical imaginary plane orthogonal to the center axis extending in the forward and backward direction of the automobile.

Referring to FIG. 1 which is a cross-sectional view cut at a vertical imaginary plane orthogonal to the center axis extending in the forward and backward direction of an automobile, an energy absorbing structure is intended to absorb energy in the vehicle body upper portion including a structural member 20 and furnishings 22 for a passenger compartment.

In the illustrated embodiment, the structural member 20 is a roofside rail, and an outer panel 24 and an inner panel 26 form a space 28 having a closed section. Further, a reinforcing panel 30 is disposed between the outer panel 24 and the inner panel 26, thereby enhancing the rigidity of the roofside rail 20. On the other hand, the furnishings 22 is an assist grip.

An energy absorbing bracket 32 made by bending a flat steel plate is disposed in the space 28 having the closed section. The energy absorbing bracket 32 has outer rim portions 34, 35 adhered as mentioned later and an intermediate portion 36 positioned close to the inner panel 26, and is deformable in the outward direction A of the passenger compartment. The intermediate portion 36, when a load in the inward direction B of the passenger compartment is applied to the energy absorbing bracket 32, is not brought into substantial contact with the inner panel 26, and catches the load with the rigidity of the energy absorbing bracket 32 itself. Accordingly, a generation of an abnormal sound due to the contact of the energy absorbing bracket with the inner panel can be prevented.

In the illustrated embodiment, the outer rim portion 34 of the energy absorbing bracket 32 is spot-welded to the inner panel 26, while the outer rim portion 35 is spot-welded by overlapping with respective flanges 25 at one joint portion 55 of two flange joint portions 54. 55 of the outer panel 24, the inner panel 26 and the reinforcing panel 30. As a result, the portion of the outward closed sectional space 28 of the energy absorbing bracket 32 becomes an energy absorbing space where the energy absorbing bracket 32 can be deformed. Preferably, the energy absorbing bracket 32 is substantially uniformly deformed against an impact load from support means 42 to be mentioned later in the outward direction A. For this reason, in the illustrated embodiment, a concave portion 38 which is convex in the outward direction A is provided between the outer rim portion 34 and the intermediate portion 36 of the energy absorbing bracket 32, the intermediate portion 36 being formed such that the length of the intermediate portion from the center of the support means 42 to the rim portion 34 is substantially the same as that of the intermediate portion from the center of the support means 42 to the rim portion 35 in the closed section in FIG. 1.

The furnishings 22 for the passenger compartment is supported by the support means 42, while the support means 42 is mounted on the intermediate portion 36 of the energy absorbing bracket 32, passing through a hole 40 made in the inner panel 26.

In the illustrated embodiment, the support means 42 includes a bolt 44 and a resin spacer 46. The spacer 46 is cylindrical and ensures a deformation amount required for an assist grip 22 as the equipment for the passenger compartment to absorb energy, and enables the energy absorbing bracket 32 to be deformed by this amount of deformation. Namely, the energy absorbing bracket 32 is deformed in the outward direction A until the large diameter portion 47 provided in the spacer 46 abuts the inner panel 26. While one end of the spacer 46 is abutted against the intermediate portion 36 of the energy absorbing bracket 32 and the end portion 23 of the assist grip 22 is abutted against the other end of the spacer 46, the bolt 44 is passed through the end portion 23 and the spacer 46 to be screwed into a nut 48 welded beforehand to the energy absorbing bracket 32. Thus, the assist grip 22 is mounted on the energy absorbing bracket 32. The other end portion (not shown) of the assist grip 22 is also mounted on the energy absorbing bracket 32 or another energy absorbing bracket through a similar structure.

As a matter of fact, an interior trim material 50 is disposed inwardly of the inner panel 26. The support means 42, therefore, must also be passed through the interior trim material 50 to screw the bolt 44 into the nut 48. For the sake of convenience in the operation, it is preferable to make the hole 40 of the inner panel 26 rather large. Since a space is formed between the interior trim material 50 and the inner panel 26, an energy absorption can be intended by disposing an energy absorbing material 52 such as a resin lattice rib or an urethan pad capable of absorbing energy in the space and deforming it by the interior trim material 50. In this case, the energy absorption is carried out by a deformation of the energy absorbing material 52 and by a deformation of the energy absorbing bracket 32.

A weather strip 56 is attached to one joint portion 54 of the two flange joint portions of the roofside rail 20, while a roof panel 58 is welded to the other flange joint portion 55, and then the roofside rail 20 is put into use. When a predetermined or more impact load from the furnishings 22 in the outward direction A through the support means 42 is applied, the energy absorbing bracket 32 is deformed as shown by an imaginary line to absorb the energy.

Figure 2:
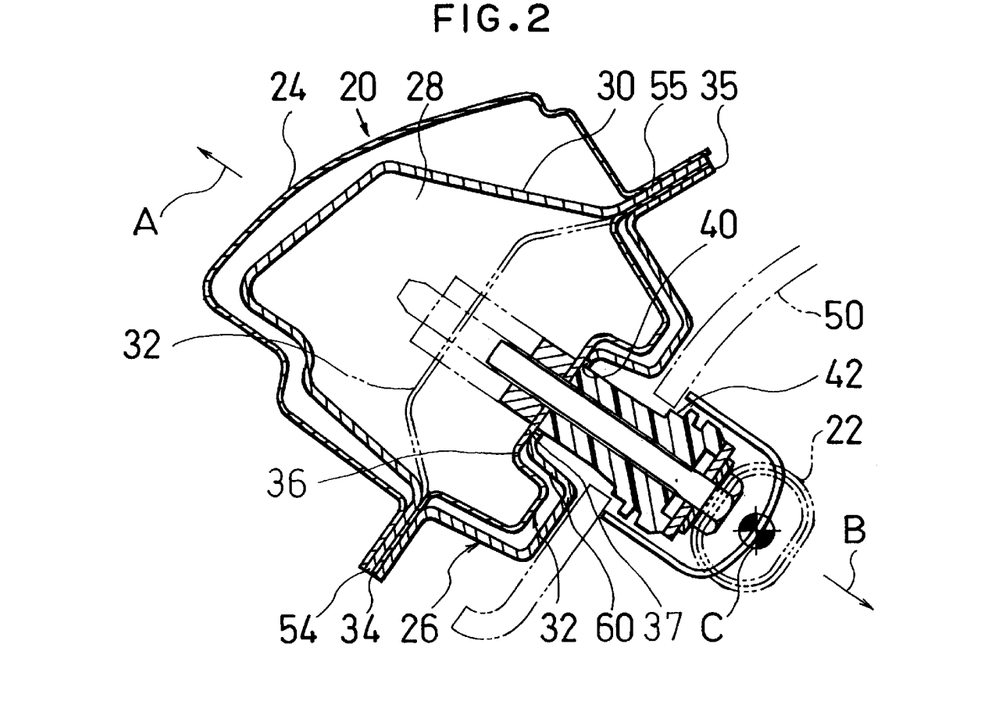
FIG. 2 is a cross-sectional view similar to FIG. 1, of another embodiment of the energy absorbing structure of a vehicle body upper portion of an automobile relative to the present invention.

In the embodiment shown in FIG. 2, the structural member 20 is a roofside rail, and has a closed sectional space 28 formed by the outer panel 24 and the inner panel 26. Further, the basic structure in which the reinforcing panel 30 is disposed between the outer panel 24 and the inner panel 26 and the energy absorbing bracket 32 is disposed in the closed sectional space 28 is the same as that of FIG. 1. In the embodiment shown in FIG. 2, the inner panel 26 has a seat portion 60 which is convex in the outward direction A, and the hole 40 passing through the support means 42 is made in the seat portion 60. As mentioned above, when the support means 42 passing through the interior trim material 50 is directed to the hole 40, the seat portion 60 can guide in inserting the support means into the hole 40 of the inner panel. Further, the seat portion 60 can enhance the rigidity of the rim of the hole 40, and when the direction of the outward impact load is inclined to the support means 42, the seat portion 60 can prevent the support means 42 from falling, and the support means 42 is guided to be displaced outwardly of the passenger compartment.

In the embodiment shown in FIG. 2, two outer rim portions 34, 35 of the energy absorbing bracket 32 are welded to the two flange joint portions 54, 55 of the roofside rail 20. The intermediate portion 36 of the energy absorbing bracket 32 has a portion 37 to be brought into contact with the inner panel 26 when a load in the inward direction B is applied, while the support means 42 is mounted on the energy absorbing bracket 32 at a portion surrounded by the contact portion 37. The intermediate portion 36 is formed such that the length of the intermediate portion from the center of the support means 42 to the rim portion 34 is substantially the same as that of the intermediate portion from the center of the support means 42 to the rim portion 35 in the closed section in FIG. 1. The energy absorbing bracket 32, when a predetermined or more impact load in the outward direction A is applied to a point C of the assist grip 22, is deformed as shown by an imaginary line. On the other hand, when a load in the inward direction B is applied, the energy absorbing bracket 32 is brought into contact with the inner panel 26 at the seat portion 60 of the inner panel 26. In other words, when the energy absorbing bracket 32 is subjected to the inwardly directed load, the load is caught by a cooperation of the energy absorbing bracket 32 and the inner panel 26, so that the thickness of the energy absorbing bracket 32 can be made small.

Figure 3:
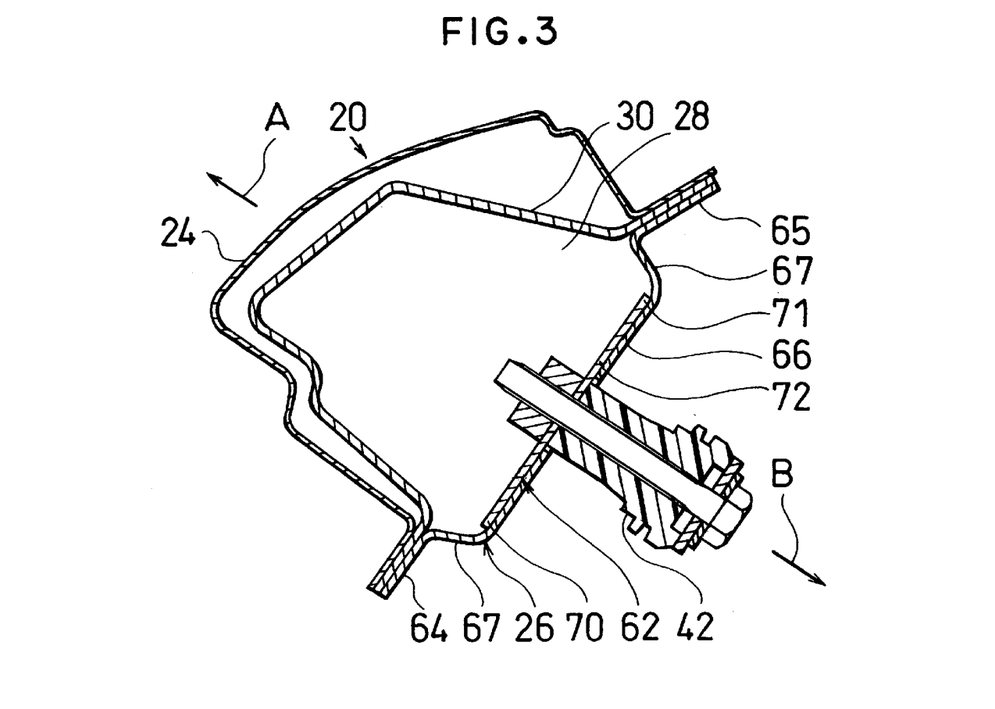
FIG. 3 is a cross-sectional view similar to FIG. 1, of a further embodiment of the energy absorbing structure of a vehicle body upper portion of an automobile relative to the present invention.

In the embodiment shown in FIG. 3, the structural member 20 is a roofside rail and has the closed sectional space 28 formed by the outer panel 24 and the inner panel 26. Further, the basic structure in which the reinforcing panel 30 is disposed between the outer panel 24 and the inner panel 26, and an energy absorbing bracket 62 is disposed in the closed sectional space 28 is the same as that of FIG. 1.

In the embodiment shown in FIG. 3, the inner panel 26 includes two flange joint portions 64, 65 joined with the outer panel and spaced apart in the width direction or lateral direction of the vehicle body, an inner portion 66 spaced apart from the flange joint portions 64, 65 in the inward direction B, and an inclined portion 67 connecting the inner portion 66 with each of the flange joint portions 64, 65. On the other hand, the energy absorbing bracket 62 is substantially a flat plate, the outer rim portions 70, 71 of which are spot-welded to the inner portion 66 of the inner panel 26, and the support means 42 is attached to the intermediate portion 72. In this embodiment, when a predetermined or more impact load from the support means 42 in the outward direction A is applied, the spot-welding comes off, thereby the energy absorbing bracket 62 absorbing the energy.

According to the embodiment shown in FIG. 3, since the outer rim portions 70, 71 of the energy absorbing bracket 62 are welded to the inner portion 66 of the inner panel 26, it is possible to improve a poor productivity due to the thickening of the whole which is caused in case the outer rim portions of the energy absorbing bracket are welded respectively at the two flange joint portions of the outer panel, the inner panel and the reinforcement panel of the roofside rail.

Figure 4:
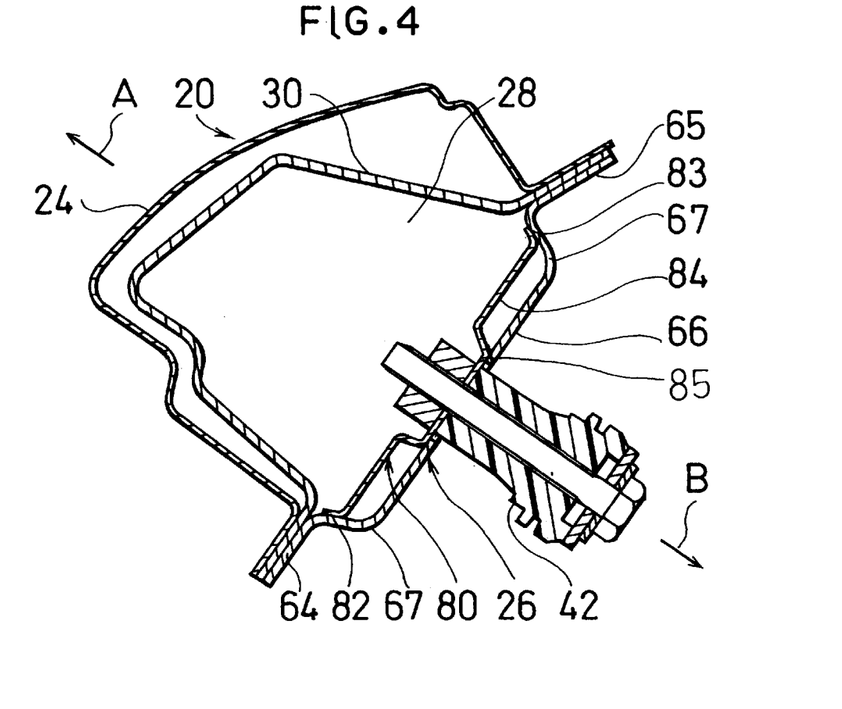
FIG. 4 is a cross-sectional view similar to FIG. 1, of a still another embodiment of the energy absorbing structure of a vehicle body upper portion of an automobile relative to the present invention.

In the embodiment shown in FIG. 4, the structural member 20 is a roofside rail and has a closed sectional space 28 formed by the outer panel 24 and the inner panel 26. Further, the basic structure in which the reinforcing panel 30 is disposed between the outer panel 24 and the inner panel 26 and an energy absorbing bracket 80 is disposed in the closed sectional space 28 is the same as that of FIG. 1.

In the embodiment shown in FIG. 4, the inner panel 26 includes two flange joint portions 64, 65 joined with the outer panel 24 and spaced apart in the width direction of the vehicle body, an inner portion 66 spaced apart from the flange joint portions 64, 65 in the inward direction B, and an inclined portion 67 connecting the inner portion 66 and each of the flange joint portions 64, 65. On the other hand, the energy absorbing bracket 80 is shaped such that outer rim portions 82, 83 coincide with the inclined portions 67 of the inner panel 26, and an intermediate portion 84 is shaped like steps to be connected to the outer rim portions 82, 83. The outer rim portions 82, 83 of the energy absorbing bracket 80 are spot-welded to the inclined portion 67 of the inner panel, while the support means 42 is mounted on the energy absorbing bracket 80 at the center of the intermediate portion 84. The intermediate portion 84 is formed such that the length of the intermediate portion 84 from the center of the support means 42 to the rim portion 82 is substantially the same as that of the intermediate portion 84 from the center of the the support means 42 to the rim portion 83 in the closed section in FIG. 4 and has a portion 85 to be brought into contact with the inner panel 26 when a load in the inward direction B is applied. In this embodiment, the energy absorbing bracket 80 is deformed when a predetermined or more impact load in the outward direction A is applied. When the deformation of the bracket 80 reaches a fixed amount, the welding comes off, and the energy is absorbed by the deformation and the coming off.

Figure 5:
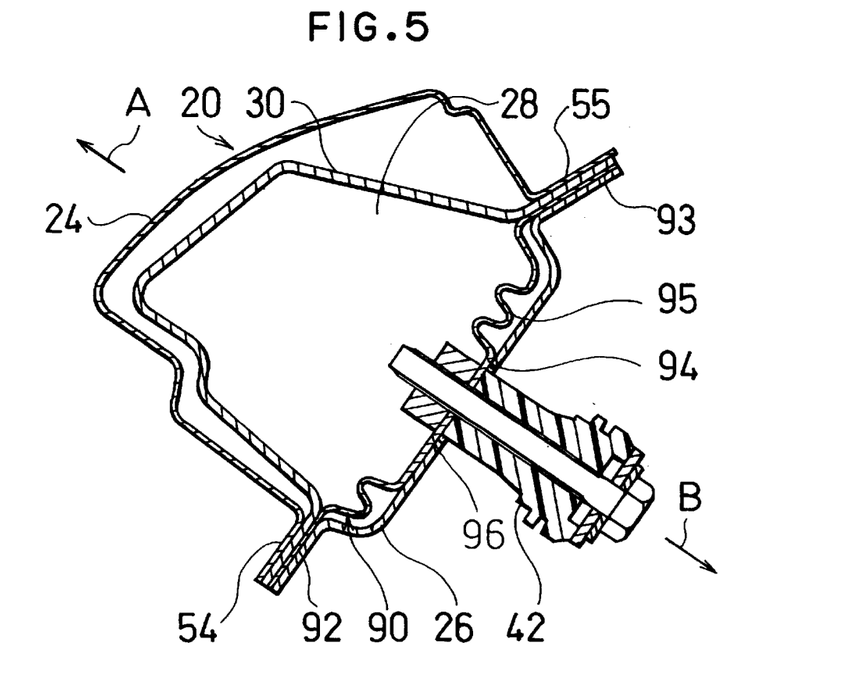
FIG. 5 is a cross-sectional view similar to FIG. 1, of a still another embodiment of the energy absorbing structure of a vehicle body upper portion of an automobile relative to the present invention.

In the embodiment shown in FIG. 5, the structural member 20 is a roofside rail and has a closed sectional space 28 formed by the outer panel 24 and the inner panel 26. Further, the basic structure in which the reinforcing panel 30 is disposed between the outer panel 24 and the inner panel 26 and an energy absorbing bracket 90 is disposed in the closed sectional space 28 is the same as that of FIG. 1.

In the embodiment shown in FIG. 5, the energy absorbing bracket 90 has outer rim portions 92, 93, and an intermediate portion 94. In the intermediate portion 94 a bellows portion or an uneven portion 95 is formed. The intermediate portion has a portion 96 to be brought into contact with the inner panel 26 when a load in the inward direction B is applied. The energy absorbing bracket 90 is spot-welded to the flange joint portions 54, 55 at the outer rim portions 92, 93, and the support means 42 is attached to a position surrounded by the contact portion 96 in the center of the bellows portion or uneven portion 95. The bellows portion or uneven portion 95 is formed such that the length of the uneven portion 95 from the center of the support means 42 to the rim portion 92 is substantially the same as that of the uneven portion 95 from the center of the support means 42 to the rim portion 93 when the uneven portion 95 extends in the closed section in FIG. 5. In this embodiment, when a predetermined or more impact load in the outward direction A is applied from the support means 42, firstly the bellows portion or uneven portion 95 extends and then the whole deforms, thereby absorbing the energy. Consequently, an initial energy absorbing characteristic can be adjusted by the bellows portion or the uneven portion 95.

Figure 6:
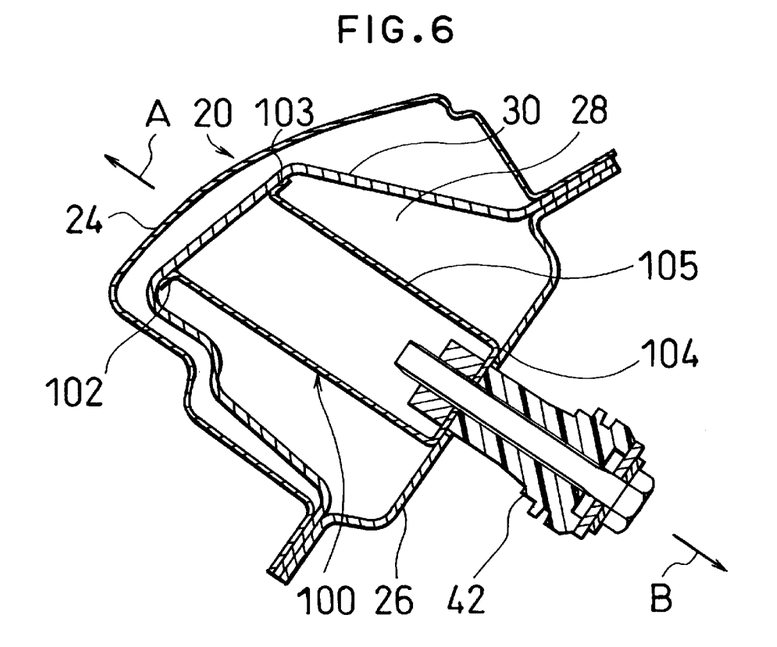
FIG. 6 is a cross-sectional view similar to FIG. 1, of a still another embodiment of the energy absorbing structure of a vehicle body upper portion of an automobile relative to the present invention.

In the embodiment shown in FIG. 6, the structural member 20 is a roofside rail and has a closed sectional space 28 formed by the outer panel 24 and the inner panel 26. Further, the basic structure in which the reinforcing panel 30 is disposed between the outer panel 24 and the inner panel 26 and an energy absorbing bracket 100 is disposed in the closed sectional space 28 is the same as that of FIG. 1.

In the embodiment shown in FIG. 6, the energy absorbing bracket 100 has outer rim portions 102, 103, an intermediate portion 104 spaced apart from the outer rim portions in the inward direction B, and a rising portion 105 connecting the intermediate portion 104 and each of the outer rim portions 102, 103. The outer rim portions 102, 103 are spot-welded to the reinforcing panel 30, and the support means 42 is mounted on the intermediate portion 104. The intermediate portion 104 is brought into contact with the inner panel 26 when a load in the inward direction B is applied. In case the roofside rail 20 does not include the reinforcing panel 30, the energy absorbing bracket 100 can be adhered to the outer panel 24. In this embodiment, when a predetermined or more impact load in the outward direction A is applied from the support means 42, the energy absorbing bracket 100 absorbs the energy by buckling of the rising portion 105.

Figure 7:
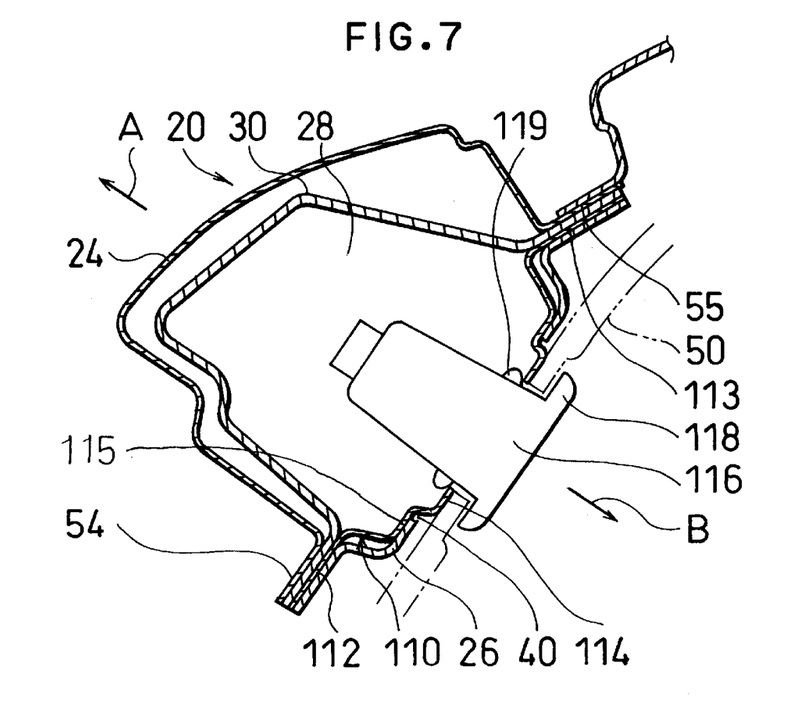
FIG. 7 is a cross-sectional view similar to FIG. 1, of a still another embodiment of the energy absorbing structure of a vehicle body upper portion of an automobile relative to the present invention.

In the embodiment shown in FIG. 7, the structural member 20 is a roofside rail and has a closed sectional space 28 formed by the outer panel 24 and the inner panel 26. Further, the basic structure in which the reinforcing panel 30 is disposed between the outer panel 24 and the inner panel 26 and an energy absorbing bracket 110 is disposed in the closed sectional space 28 is the same as that of FIG. 1.

In the embodiment shown in FIG. 7, the energy absorbing bracket 110 has outer rim portions 112, 113, and an intermediate portion 114 spaced apart from the outer rim portions in the inward direction B. The outer rim portions 112, 113 are spot-welded to the flange joint portions 54, 55 of the roofside rail 20, and the intermediate portion 114 is formed like steps to be connected to the outer rim portions 112, 113. The intermediate portion 114 is formed such that the length of the intermediate portion 114 from the center of support means 116 to the rim portion 112 is substantially the same as that of the intermediate portion 112 from the center of the support means 116 to the rim portion 113 in the closed section in FIG. 7 and has a portion 115 to be brought into contact with the inner panel 26 when a load in the inward direction B is applied. The support means 116 mounted on the intermediate portion 114 is a casing of a reading lamp. The support means 116 is mounted on the energy absorbing bracket 110 in a state of sandwiching the periphery of the energy absorbing bracket 110 and the interior trim material 50 with a flange 118 and a projection 119. In this embodiment, when a predetermined or more impact load in the outward direction A is applied from a cover of the reading lamp as furnishings for the passenger compartment through support means 116, the support means 116 enters the closed sectional space 28, followed by a deformation of the energy absorbing bracket, thereby absorbing the energy. For this, the hole 40 of the inner panel 26 is made large enough to enable the flange 118 to pass through.

Figure 8:
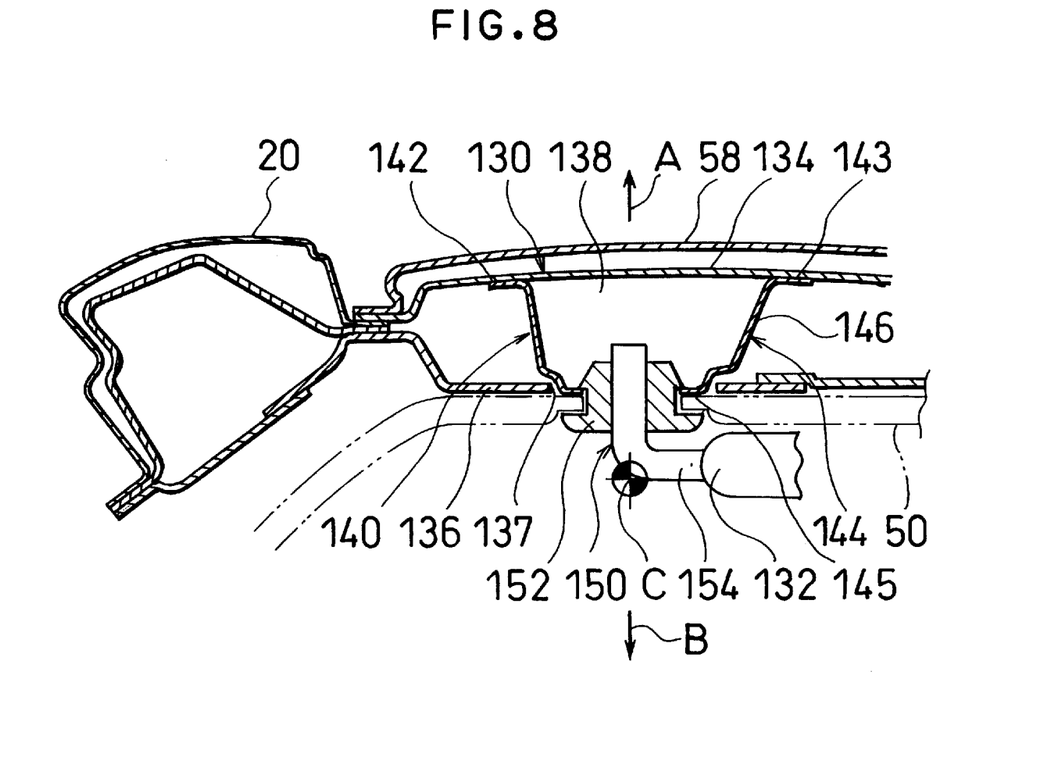
FIG. 8 is a cross-sectional view similar to FIG. 1, of a still another embodiment of the energy absorbing structure of a vehicle body upper portion of an automobile relative to the present invention.

In the embodiment shown in FIG. 8, a structural member 130 is a header of a vehicle body, and furnishings 132 for passenger compartment is a sun visor. The header 130 extends from the front end of the roofside rail 20 in the lateral direction of the vehicle body, that is, in the width direction. The header 130 is formed to have a closed sectional space 138 by an outer panel 134 and an inner panel 136 when cut at a vertical imaginary plane including the center axis extending in the forward and backward direction of an automobile. An energy absorbing bracket 140 is disposed in the closed sectional space 138. A roof panel 58 is positioned above the header 130.

In the illustrated embodiment, the energy absorbing bracket 140 includes base portions 142, 143 which are two outer rim portions to be welded to the outer panel 134 with a distance in the width direction of the vehicle body and an intermediate portion 144. The intermediate portion 144 has an inner portion 145 with a distance from the base portions 142, 143 inwardly thereof, and an inclined portion 146 connecting the inner portion 145 and each of the base portions 142, 143. The sun visor 132 is mounted on the inner portion 145 of the energy absorbing bracket 140 by support means 150. The support means 150 is composed of a boss 152 passing through a hole 137 of the inner panel 136 to be fitted into the inner portion 145 and the interior trim material 50, and an L-shaped arm 154 rotatably supported by the boss 152, and the sun visor 132 is rotatably attached to the arm 154. In this embodiment, when a predetermined or more impact load in the outward direction A is applied to a point C at the corner of the arm 154, the inclined portion 146 of the energy absorbing bracket 140 is buckled, thereby absorbing the energy. According to the embodiment shown in FIG. 8, since the energy absorbing bracket 140 is welded to the outer panel 134 of the header in a so-called hat-like shape, an amount of required deformation can be easily ensured, and an energy absorption can be aimed by effectively utilizing the space 138 with a closed section of the header.

Figure 9:
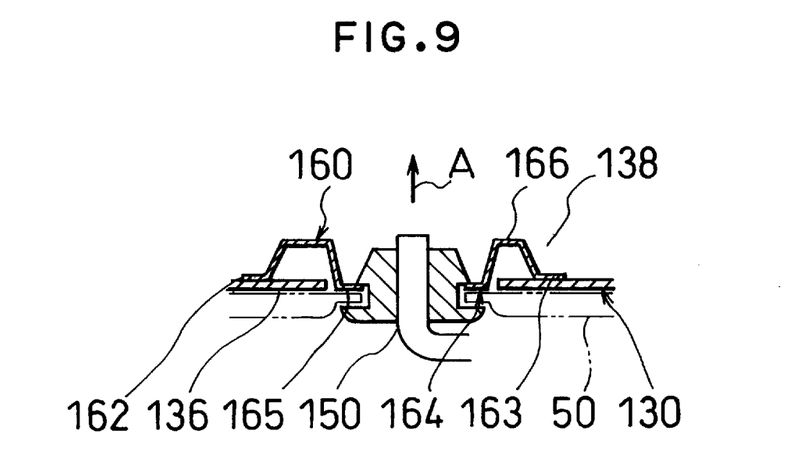
FIG. 9 is a cross-sectional view similar to FIG. 1, of a still another embodiment of the energy absorbing structure of a vehicle body upper portion of an automobile relative to the present invention.

In the embodiment shown in FIG. 9, the header 130 is formed to have the closed sectional space 138 by the outer panel not shown and the inner panel 136, and an energy absorbing bracket 160 is disposed in the closed sectional space 138.

The energy absorbing bracket 160 is composed of base portions 162, 163 which are two outer rim portions to be welded to the header inner panel 136 with a space in the width direction of the vehicle body, and an intermediate portion 164. The intermediate portion 164 has a mounting portion 165 between the base portions 162 and 163, and a zigzag portion 166 between each of the base portions 162, 163 and the mounting portion 165. The intermediate portion 164 is formed such that the length of the intermediate portion 164 from the center of support means 150 to the base portion 162 is substantially the same as that of the intermediate portion 164 from the center of the support means 150 to the base portion 163 in the closed section in FIG. 9. The support means 150 is mounted on the mounting portion 165 of the energy absorbing bracket 160. In this embodiment, when a predetermined or more impact load in the outward direction A is applied from the support means 150, the energy absorbing bracket 160 absorbs the energy by deforming so that the zigzag portion 166 may extend.

While typical embodiments are described in FIGS. 1 through 9, the present invention can be worked by replacing these embodiments or combining one with another.

For example, in FIGS. 1, 8 and 9, the energy absorbing brackets 32, 140, 160 have structures not to be brought into substantial contact with the inner panels 26, 136 when a load in the inward direction B is applied, and catch the load by their own rigidity. On the other hand, in the embodiments in FIGS. 2 through 7, the energy absorbing brackets 32, 80, 90, 100, 110 are brought into contact with the inner panels when a load in the inward direction B is applied, and catch the load in cooperation with each other, but this can be reversed.

The seat portion 60 of the inner panel 26 shown in FIG. 2 can be provided in the inner panel not only in a mode where the energy absorbing bracket is brought into contact with the inner panel but also in a mode where the energy absorbing bracket is not brought into substantial contact with the inner panel when a load in the inward direction B is applied, whereby the foregoing effect can be obtained.

The energy absorbing bracket 90 including the bellows portion or uneven portion 95 shown in FIG. 5 can be applied not only to a mode where the energy absorbing bracket is brought into contact with the inner panel but also to a mode where the energy absorbing bracket is not brought into substantial contact with the inner panel when a load in the inward direction B is applied. This is because, since the amount of the load in the inward direction B completely differs from that of the impact load in the outward direction A, it is possible to give a rigidity for supporting the load in the inward direction B to the bellows portion or uneven portion 95.

While the furnishings for passenger compartment is an assist grip is FIGS. 1 through 6 and a reading lamp in FIG. 7, it is possible to mount the reading lamp on the energy absorbing brackets 32, 62, 80, 90, 100 in FIGS. 1 through 6 and to mount the assist grip on the energy absorbing bracket 110 in FIG. 7.

What is claimed is:

1. An energy absorbing structure of a vehicle body upper portion of an automobile, comprising:

a structural member being formed so as to have a closed sectional space comprising:
an outer panel member having two flanges;
an inner panel member cooperating with said outer panel to form the closed sectional space and having two flanges overlapped and joined with the flanges of said outer panel member; and
a reinforcing panel member disposed in the closed sectional space having two flanges overlapped and joined with the flanges of said inner panel member and said outer panel member, said reinforcing panel member having an intermediate portion between the two flanges which protrudes outwardly from the two flanges and defining an energy absorbing space between said inner panel member and said intermediate portion;

a metal energy absorbing bracket deformable outwardly of a passenger compartment and disposed substantially in the energy absorbing space, said metal energy absorbing bracket having a thickness less than that of said inner panel member, and having at least one outer rim portion adhered to one of said flanges and a portion between the flanges of said inner panel member; and a supporting member for supporting a furnishing for a passenger compartment disposed in the inward facing side of said structural member, passing through a hole defined by said inner panel, said supporting member being attached to a portion other than said outer rim portion of said energy absorbing bracket.

2. An energy absorbing structure of a vehicle body upper portion of an automobile, comprising:

a structural member being formed so as to have a closed sectional space, comprising:
an outer panel member having two flanges:
an inner panel member cooperating with said outer panel member to form the closed sectional space and having two flanges overlapped and joined with the flanges of said outer panel member; and
a reinforcing panel member disposed in the closed sectional space so as to define an energy absorbing space between said inner panel member and said reinforcing panel member;

a metal energy absorbing bracket deformable outwardly of a passenger compartment and disposed substantially in the energy absorbing space, said metal energy absorbing bracket having a thickness less than that of said inner panel member, and having outer rim portions adhered to one of said flanges and a portion between the flanges of said inner panel member; and a supporting member for supporting a furnishing for a passenger compartment disposed in the inward facing side of said structural member passing through a hole defined by said inner panel member, said supporting member being attached to a portion other than said outer rim portions of said energy absorbing bracket, wherein said metal energy absorbing bracket is sufficiently rigid to prevent said portion other than said outer rim portions of said metal energy absorbing bracket from being brought into substantial contact with said inner panel member when an inward load is applied to said metal energy absorbing bracket through a load applied to said furnishing.

3. An energy absorbing structure according to claim 2, wherein said energy absorbing bracket has two outer rim portions spaced apart, and wherein said portion other than said outer rim portions of said energy absorbing bracket is an intermediate portion, the intermediate portion being formed such that the length of the intermediate portion from the center of the supporting member to one rim portion is substantially the same as that of the intermediate portion from the center of the supporting member to the other rim portion in said closed sectional space.

4. An energy absorbing structure according to claim 1, further comprising an interior trim material disposed inwardly of the inner panel member with a space and an energy absorbing material disposed in said space capable of absorbing energy.

5. An energy absorbing structure according to claim 1, wherein
said energy absorbing bracket includes an intermediate portion to be brought into contact with said inner panel member when said energy absorbing bracket is subjected to an inwardly directed load applied to said energy absorbing bracket through said supporting member, and the mounting portion of said supporting member on said energy absorbing bracket is surrounded by the contacting portion of said intermediate portion.

6. An energy absorbing structure according to claim 5, wherein said intermediate portion of said energy absorbing bracket is formed such that the length of the intermediate portion from the center of the supporting member to one rim portion is substantially the same as that of the intermediate portion from the center of the supporting member to the other rim portion in said closed sectional space.

7. An energy absorbing structure according to claim 5, wherein said structural member is a roofside rail of the vehicle body, wherein said inner panel member includes two flange joint portions joined with said outer panel member, an inner portion spaced apart from said flange joint portions inwardly thereof, and an inclined portion connecting the inner portion and each of said flange joint portions, and wherein said outer rim portion of said energy absorbing bracket is welded to one of said inner portion and said inclined portion of said inner panel member.

8. An energy absorbing structure according to claim 7, wherein said energy absorbing bracket is substantially a flat plate and is welded to said inner portion of said inner panel member.

9. An energy absorbing structure according to claim 7, wherein said energy absorbing bracket is shaped such that said outer rim portion coincides with said inclined portion of said inner panel member and said intermediate portion is formed like steps, and wherein said outer rim portion is welded to said inclined portion of said inner panel member.

10. An energy absorbing structure according to claim 1, wherein said inner panel member includes a seat portion made convex outwardly of the passenger compartment, and wherein said hole is made in said seat portion.

11. An energy absorbing structure according to claim 1, wherein said structural member is a roofside rail of the vehicle body, and wherein said energy absorbing bracket includes a bellows portion or uneven portion, and wherein said supporting member is attached to the portion surrounded by said bellows portion or uneven portion of said energy absorbing bracket.

12. An energy absorbing structure according to claim 1, wherein said structural member is a roofside rail of the vehicle body, and wherein said outer rim portion of said energy absorbing bracket is welded respectively to the two flange joint portions of said outer panel of said roofside rail and said inner panel member.

13. An energy absorbing structure according to claim 1, wherein said structural member is a roofside rail, and said supporting member includes a bolt and a spacer which is cylindrical, said bolt being fastened to an outward facing side of said energy absorbing bracket to ensure a deformation amount of said energy absorbing bracket required for said furnishings to absorb energy.

14. An energy absorbing structure according to claim 1, wherein said structural member is a roofside rail, and wherein said energy absorbing bracket is welded to one of said outer panel of said roofside rail, and a reinforcing panel member disposed between said outer panel member and said inner panel member.

15. An energy absorbing structure according to any one of claims 7 through 14, wherein said furnishings is an assist grip.

16. An energy absorbing structure of a vehicle body upper portion of an automobile comprising:
a roofside rail structure being formed so as to have a closed sectional space, comprising:
an outer panel member having two flanges;
an inner panel member cooperating with said outer panel to form said closed sectional space having two flanges overlapped and joined with the flanges of said outer panel member; and
a reinforcing panel member disposed between said outer panel member and said inner panel member;
a metal energy absorbing bracket deformable outwardly from a passenger compartment, disposed substantially in said closed sectional space and having two outer rim portions spaced apart and an intermediate portion provided between said two rim portions, said intermediate portion being inclined from the horizontal and vertical planes so as to receive a substantially orthogonal impact load and being located substantially in the middle of said two outer rim portions in said closed sectional space; and
an assist grip component disposed in a passenger compartment and in an inward facing side of said roofside rail structure; and
supporting member for supporting said assist grip component passing through a hole defined by said inner panel member, said support means being attached to said intermediate portion of said bracket.

17. An energy absorbing structure of a vehicle body upper portion of an automobile according to claim 16, wherein said intermediate portion of said bracket has sufficient rigidity so as to not be brought into substantial contact with said inner panel member when an inward load produced by pulling said assist grip component is applied.

18. An energy absorbing structure of a vehicle body upper portion of an automobile according to either claim 16, or 17, wherein said supporting member includes a bolt and a spacer which is cylindrical and has sufficient length to ensure a deformation amount required for said assist grip component to absorb energy.

19. An energy absorbing structure of a vehicle body upper portion of an automobile, comprising:
a structural member being formed so as to have a closed sectional space, comprising:
an outer panel member having two flanges;
an inner panel member cooperating with said outer panel to form the closed sectional space and having two flanges overlapped and joined with the flanges of said outer panel member; and
a reinforcing panel member disposed between said outer panel member and said inner panel member;
a metal energy absorbing bracket deformable outwardly of a passenger compartment and disposed substantially in the closed sectional space, said metal energy absorbing bracket having a thickness less than that of said inner panel member, and having at least one outer rim portion adhered to one of said flanges and a portion between the flanges of said inner panel member; and a supporting member, for supporting a furnishing for a passenger compartment disposed in the inward facing side of said structural member, passing through a hole defined by said inner panel member, said supporting member being attached to a portion other than said at least one outer rim portion of said energy absorbing bracket, wherein said metal energy absorbing bracket is sufficiently rigid to prevent said portion other than said at least once outer rim portion of said metal energy absorbing bracket from being brought into substantial contact with said inner panel member when an inward load is applied to said metal energy absorbing bracket through a load applied to said furnishing.

20. An energy absorbing structure according to claim 19, wherein said energy absorbing bracket has two outer rim portions spaced apart, and wherein said portion other than said two outer rim portions of said energy absorbing bracket is an intermediate portion, the intermediate portion being formed such that the length of the intermediate portion from the center of the supporting member to one of said two outer rim portions is substantially the same as that of the intermediate portion in said closed sectional space.

21. An energy absorbing structure of a vehicle body upper portion of an automobile, comprising:
- a structural member being formed so as to have a closed sectional space, comprising:
  - an outer panel member having two flanges;
  - an inner panel member cooperating with said outer panel to form the closed sectional space having two flanges overlapped and joined with the flanges of said outer panel member; and
  - a reinforcing panel member disposed between said outer panel member and said inner panel member;
- a metal energy absorbing bracket deformable outwardly of a passenger compartment and disposed substantially in the closed sectional space, said metal energy absorbing bracket having a thickness less than that of said inner panel member, and having at least one outer rim portion adhered to one of said flanges and a portion between the flanges of said inner panel member; and
- a supporting member for supporting a furnishing for a passenger compartment disposed in the inward facing side of said structural member, passing through a hole defined by said inner panel member, said supporting member being attached to a portion other than said at least one outer rim portion of said energy absorbing bracket, wherein said energy absorbing bracket includes an intermediate portion to be brought into contact with said inner panel member when said energy absorbing bracket is subjected to an inwardly directed load applied to said energy absorbing bracket through said supporting member, and the mounting portion of said supporting member on said energy absorbing bracket is surrounded by the contacting portion of said intermediate portion.

22. An energy absorbing structure according to claim 21, wherein the intermediate portion of said energy absorbing bracket is formed such that the length of the intermediate portion from the center of the supporting member to the at least one outer rim portion is substantially the same as that of the intermediate portion from the center of the supporting means to another outer rim portion in said closed sectional space.

23. An energy absorbing structure according to claim 21, wherein said structural member is a roofside rail of the vehicle body, wherein said inner panel member includes two flange joint portions joined with said outer panel member, an inner portion spaced apart from said flange joint portions inwardly thereof, and an inclined portion connecting the inner portion and each of the two flange joint portions, and wherein said outer rim portion of said energy absorbing bracket is welded to one of said inner portion and said inclined portion of said inner panel member.

24. An energy absorbing structure according to claim 23, wherein said energy absorbing bracket is substantially a flat plate and is welded to said inner portion of said inner panel member.

25. An energy absorbing structure according to claim 23, wherein said energy absorbing bracket is shaped such that said outer rim portion coincides with said inclined portion of said inner panel member and said intermediate portion is formed in the shape of steps, and wherein said outer rim portion is welded to said inclined portion of said inner panel member.

26. An energy absorbing structure of a vehicle body upper portion of an automobile, comprising:
- a structural member being formed so as to have a closed sectional space, comprising:
  - an outer panel member having two flanges;
  - an inner panel member cooperating with said outer panel to form the closed sectional space having two flanges overlapped and joined with the flanges of said outer panel member; and
  - a reinforcing panel member disposed between said outer panel member and said inner panel member;
- a metal energy absorbing bracket deformable outwardly of a passenger compartment and disposed substantially in the closed sectional space, said metal energy absorbing bracket having a thickness less than that of said inner panel member, and having at least one outer rim portion adhered to one of said flanges and a portion between said flanges of said inner panel member; and
- a supporting member for supporting a furnishing for a passenger compartment disposed in the inward facing side of said structural member, passing through a hole defined by said inner panel member, said supporting member being attached to a portion other than said at least one outer rim portion of said energy absorbing bracket, wherein said inner panel member includes a seat portion made convex outwardly of the passenger compartment, and wherein said hole is made in said seat portion.

27. An energy absorbing structure of a vehicle body upper portion of an automobile, comprising:
- a structural member being formed so as to have a closed sectional space, comprising:
  - an outer panel member having two flanges;
  - an inner panel member cooperating with said outer panel to form the closed sectional space and having two flanges overlapped and joined with the flanges of said outer panel member; and
  - a reinforcing panel member disposed between said outer panel member and said inner panel member;
- a metal energy absorbing bracket deformable outwardly of a passenger compartment and disposed substantially in the closed sectional space, said metal energy absorbing bracket having a thickness less than that of said inner panel member, and having at least one outer rim portion adhered to one of said flanges and a portion between the flanges of said inner panel member; and a supporting member for supporting a furnishing for a passenger compartment disposed in the inward facing side of said structural member, passing through a hole defined by said inner panel member, said supporting member being attached to a portion other than said at least one outer rim portion of said energy absorbing bracket, wherein said structural member is a roofside rail of the vehicle body, and wherein said at least one outer rim portion of said energy absorbing bracket is welded respectively to the rim flange joint portions of said outer panel member of said roofside rail and said inner panel member.

28. An energy absorbing structure of a vehicle body upper portion of an automobile, comprising:

a structural member being formed so as to have a closed sectional space, comprising:
an outer panel member having two flanges;
an inner panel member cooperating with said outer panel to form the closed sectional space and having two flanges overlapped and joined with the flanges of said outer panel member; and
a reinforcing panel member disposed between said outer panel member and said inner panel member;

a metal energy absorbing bracket deformable outwardly of a passenger compartment and disposed substantially in the closed sectional space, said metal energy absorbing bracket having a thickness less than that of said inner panel member, and having at least one outer rim portion adhered to one of said flanges and a portion between said flanges of said inner panel member; and a supporting member for supporting a furnishing for a passenger compartment disposed in the inward facing side of said structural member, passing through a hole defined by said inner panel member, said supporting member being attached to a portion other than said at least one outer rim portion of said energy absorbing bracket, wherein said structural member is a roofside rail, and wherein said energy absorbing bracket is welded to one of said outer panel member of said roofside rail, and a reinforcing panel member disposed between said outer panel member and said inner panel member.

* * * * *